(12) United States Patent
Gruhn

(10) Patent No.: US 9,513,115 B2
(45) Date of Patent: Dec. 6, 2016

(54) METHOD AND APPARATUS FOR OPTICAL NON-CONTACT SCANNING OF SURFACES

(71) Applicant: SmartRay GmbH, Wolfratshausen (DE)

(72) Inventor: Torsten Gruhn, Benediktbeuern (DE)

(73) Assignee: SmartRay GmbH, Wolfratshausen (DE)

( * ) Notice: Subject to any disclaimer, the term of this patent is extended or adjusted under 35 U.S.C. 154(b) by 0 days.

(21) Appl. No.: 14/613,683

(22) Filed: Feb. 4, 2015

(65) Prior Publication Data

US 2015/0233708 A1 Aug. 20, 2015

(30) Foreign Application Priority Data

Feb. 14, 2014 (DE) .......................... 10 2014 101 888

(51) Int. Cl.
 *G01B 11/24* (2006.01)
 *G01B 11/25* (2006.01)

(52) U.S. Cl.
 CPC ................................. *G01B 11/2518* (2013.01)

(58) Field of Classification Search
 CPC .. G01B 11/25; G01B 11/2518; G01B 21/047
 USPC ........................... 356/601–612, 237.1–237.6, 356/239.1–239.8
 See application file for complete search history.

(56) References Cited

U.S. PATENT DOCUMENTS

| | | | |
|---|---|---|---|
| 6,700,656 B1 | 3/2004 | Chao et al. | |
| 8,137,444 B2 * | 3/2012 | Farsad | B01D 53/14 95/152 |
| 8,614,796 B2 | 12/2013 | Rattunde | |

FOREIGN PATENT DOCUMENTS

| | | |
|---|---|---|
| DE | 19506642 | 3/1996 |
| DE | 10108221 | 9/2002 |
| DE | 102004025490 | 12/2005 |
| EP | 0701104 | 3/1996 |

* cited by examiner

*Primary Examiner* — Tri T Ton
(74) *Attorney, Agent, or Firm* — Head, Johnson & Kachigian, P.C.

(57) ABSTRACT

In order to be able to test completely transparent surfaces (22) as well as mirror surfaces (22) with optical testing methods in which light (3) is radiated onto the surface (22) to be tested and the light reflected by the surface (22) is checked by an optical test unit (6a, b) a precipitation of moisture is generated on the surface before optical testing, wherein the precipitation is generated in the form of plural small liquid droplets (8) on the surface (22) which causes a diffuse reflection of the irradiated light.

14 Claims, 6 Drawing Sheets

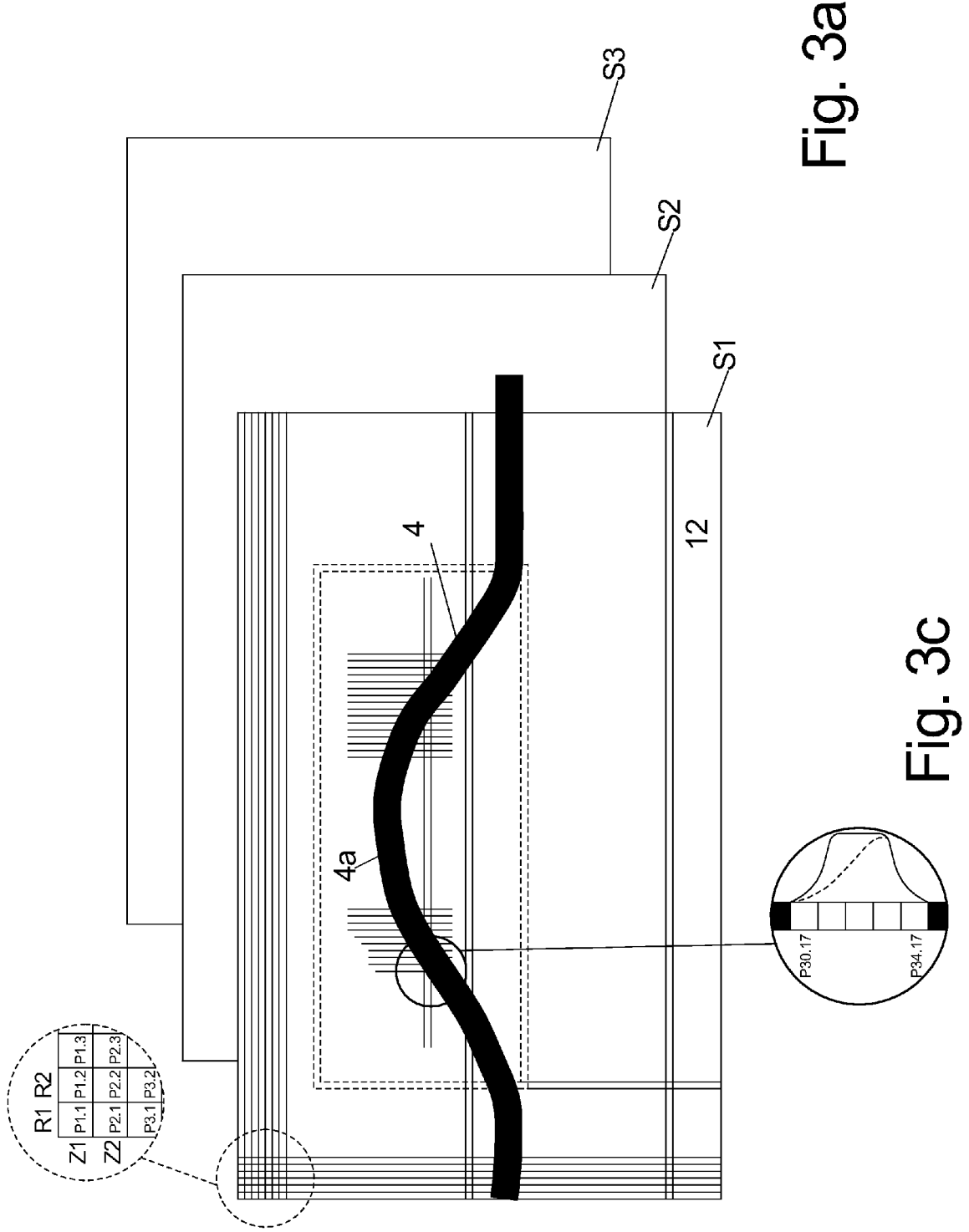

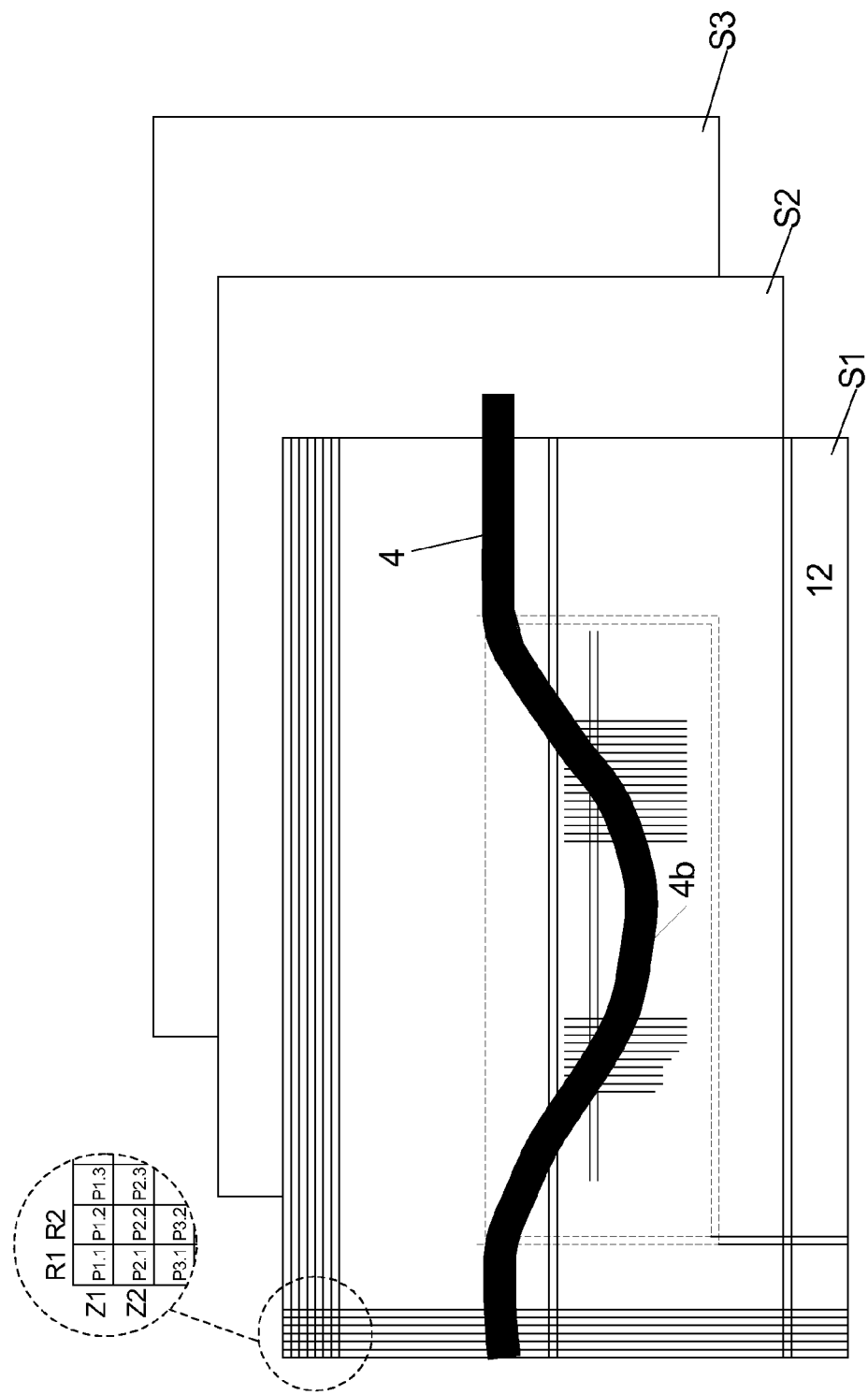

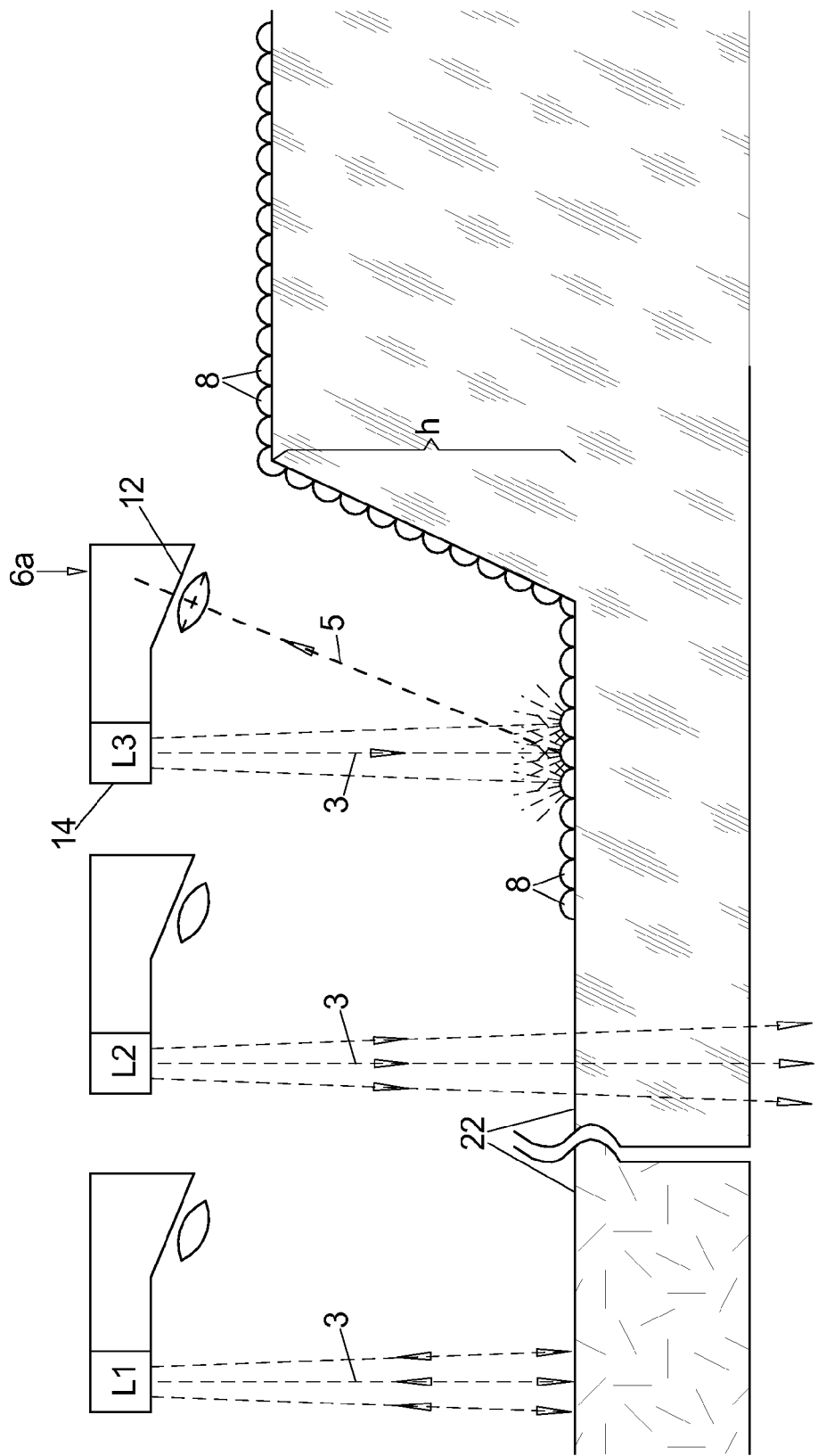

METHOD AND APPARATUS FOR OPTICAL NON-CONTACT SCANNING OF SURFACES

I. FIELD OF THE INVENTION

The invention relates to optical touch free scanning of surfaces for example using a light section triangulation method to scan to three dimensional contour of a surface.

II. BACKGROUND OF THE INVENTION

In industrial applications surface contours typically often have to be tested for dimensional compliance. Thus, optical touch free scanning methods are often used in order to prevent surfaces from getting damaged.

A widely used method is the so called light section triangulation method where a line of light is radiated onto the surface by the laser and the laser light reflected by the surface is captured by an optical sensor like e.g. a CCD sensor from a viewing direction that differs from the impact direction of the laser.

From a shape and extension of an image of a laser light line on the optical sensor an actual contour of a work piece surface at a location of the light radiated onto the surface can be computed in view of an angular offset between the applied laser light fan and the viewing direction of the CCD sensor.

The entire surface or a surface portion can be scanned and measured in this manner by a relative movement of the laser light line transversal to its extension.

In order to be able to measure recesses, undercuts etc. it is best when the laser light fan is arranged in a plane that is perpendicular to the surface to be scanned.

However, this perpendicular direction of irradiation has its problems when the surface either has a strong mirror effect because the laser light is then reflected again in the same plane, or the surface is arranged on a transparent material since the laser light then penetrates the transparent surface and the material below without being reflected at all.

The problem can only be partially circumvented in that the laser light fan is irradiated in a plane that is not orthogonal to the surface since the processing as recited supra can be more difficult or the contour determination can have errors.

III. SUMMARY OF THE INVENTION a) Technical Problem

Thus, it is an object of the invention to provide a method and a device that facilitates optical scanning of surfaces touch free in spite of perpendicular irradiation even when the surfaces have a strong mirror effect or when they are transparent.

b) Solution

The problem is solved by the features of claims 1 and 11. Advantageous embodiments can be derived from the dependent claims.

The core idea of the invention is to change reflective properties of a surface by applying a plurality of fine liquid droplets to the surface.

The plurality of approximately lenticular or semi spherical liquid droplets on the surface reflects an incoming light beam already before impacting the transparent or reflective surface of the substrate to be scanned. Namely already at a cambered surface of the individual liquid droplet. This generates a scattering of the irradiated light in all directions.

Scanning this surface with an optical touch free method can be performed the more precisely the smaller the liquid droplets are and the closer the liquid droplets are arranged relative to one another.

As soon as the liquid droplets combine to form larger drops the surface structure that is generated becomes coarser which is disadvantageous for optical scanning and measuring the surface structure.

The size of the liquid droplets therefore has to be much smaller than the smallest possible resolution which is to be scanned by the scanning head. Thus, when surface contours shall be scannable with a precision of 50μ, a diameter of the liquid droplets in top view must only be one fifth at the most, better one tenth at the most of this resolution, thus in this case 10 μm at the most or 5 μm at the most.

The greater the surface portions between the droplets that are not covered by the liquid droplets, the lower the scanability since the irradiated light is not reflected in these portions in a diffuse manner but it is either 100% completely reflected or penetrates the transparent surface.

By the same token an excessive amount of liquid must not be deposited on the surface so that no continuous liquid layer with a planar surface is generated instead of individual droplets wherein the liquid layer is also problematic with respect to optical scanning.

A method to deposit very fine liquid droplets in large numbers on a surface is precipitating the liquid on the surface from a gas phase with sufficient liquid saturation which is in particular achievable in a simple manner when the surface has a lower temperature than the liquid saturated gas. Thus, for example humid air can very quickly generate a liquid precipitation in the form of many fine liquid droplets on a cooler surface since a liquid droplet precipitates about each condensation core, thus for example about each microscopically small dust particle on the surface.

For this purpose the surface can be cooled and/or the overflowing liquid saturated air can be heated up.

Cooling the surface can be performed in a simple manner by flowing air over it that is cool enough.

As a liquid which shall precipitate on the surface and droplet shape water can be used as well as another liquid, e.g. alcohol. Advantageously the liquid shall be removable thereafter in a quick and simple manner, for example it shall evaporate at room temperature by itself again or it shall be evaporable again by flowing e.g. warm and dry air over.

Liquid droplets, however, can also be generated by themselves by spraying with a fine nozzle which sprays the liquid droplets directly onto the surface.

This method can be implemented with a device which includes a liquid source in addition to the required optical scanning head which includes the light source, the optical sensor and optionally the evaluation unit. The liquid source can be directly attached at the optical scanning head but does not have to be. The latter, however, is advantageous since it is typically sufficient to wet only the scanning portion of the optical scanning head with the liquid droplets immediately before scanning.

Therefore a nozzle for applying the liquid droplets or an outlet opening for applying liquid saturated gas, for example moist air can be directly arranged at the optical scanning head and can apply the liquid droplets to the surface before optical scanning.

By the same token a device for removing the liquid droplets can also be arranged in particular at the optical scanning head in trail, for example a nozzle for flowing warm dry air onto the surface. In particular the scanning head can also include a cooling device for cooling the surface, for example a nozzle for putting out cold air. Furthermore the scanning head can include a heating device for heating the humid gas.

EMBODIMENTS

Embodiments of the invention are subsequently described in more detail, wherein.

FIGS. 3a-c illustrate depictions of the irradiated light line;

FIG. 4 illustrates a beam path of a vapor deposited surface; and

Figure 5:
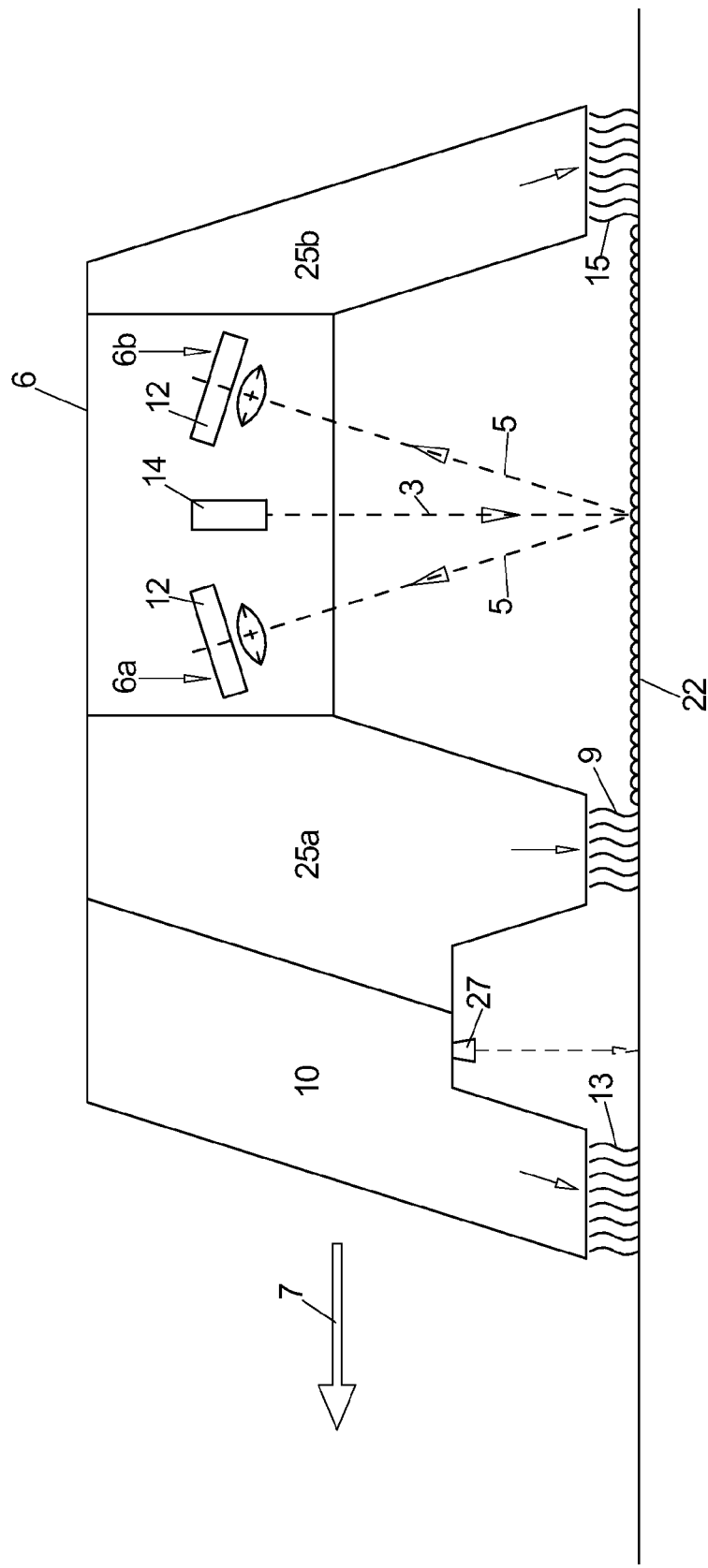

FIG. 5 illustrates a detector unit according to the invention during use.

Figure 1:
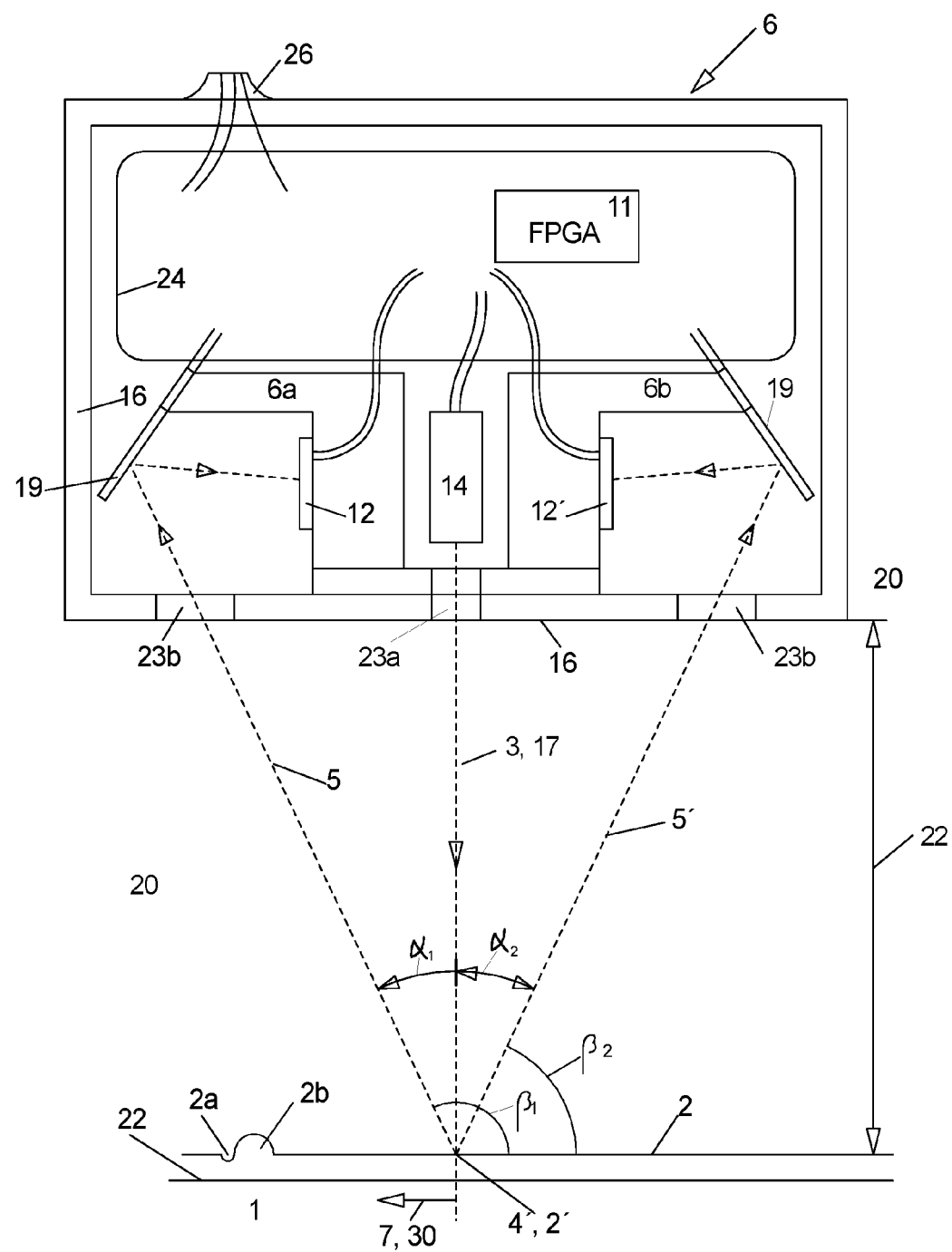
FIG. 1 illustrates a prior art detector unit in a side view.

FIG. 1 illustrates a scanning head 6 in a side view which also shows how the known light intersection triangulation method operates in principle which can be used according to the invention in addition to other touch free testing methods which are based on a reflection of light at a surface to be tested.

Figure 2:
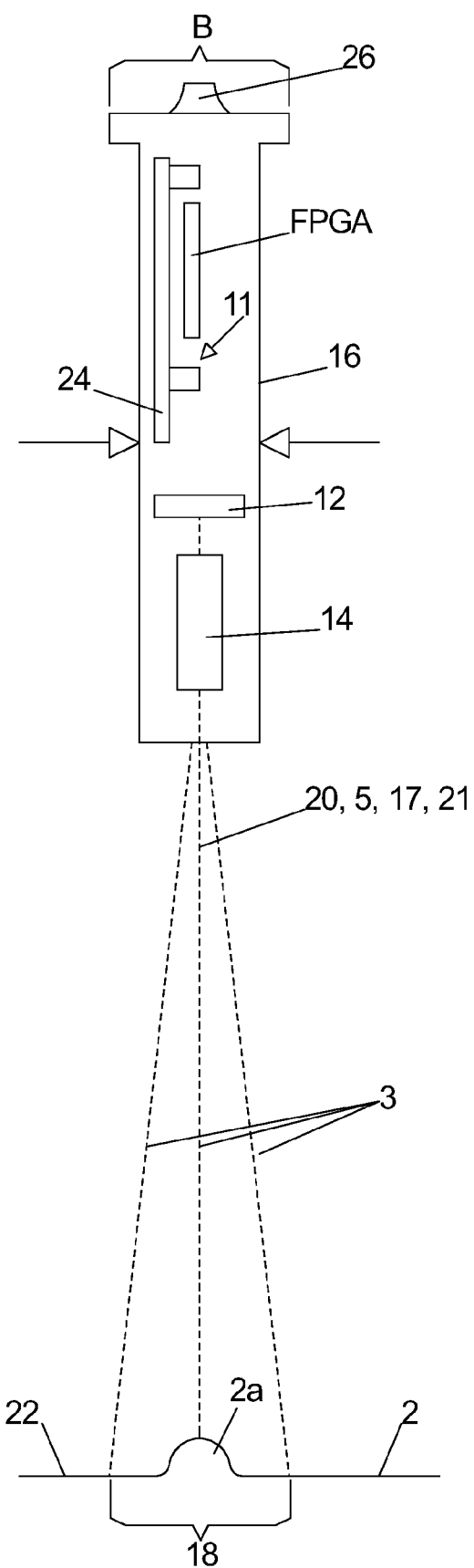
FIG. 2 illustrates the detector unit of FIG. 1 in a front view, respectively during operation.

Thus, a light beam 3, typically a laser beam is directed to the testing location 2', for example a soldering seam 2 of an object 1 and generates an image 4' on the object which is configured stripe shaped due to the beam shape of the light beam 3 as evident from FIG. 2.

The image 4' of the light beam 3 reflected from the surface 2 of the object 1 is captured in the scanning head 6 by two detector units 6a, b respectively including a flat optical sensor 12, 12' and an electronic processing unit 11 connected therewith for processing image data captured by the sensors 12, 12' in order to compute resultant data.

In order for an image 4 to be depicted on the optical sensor 12, 12', wherein the image allows conclusions with respect to the actual contour of the surface 2 at the testing location 2', the irradiation direction 17 of the light beam 3 and the viewing directions 5, 5' of the detector units 6a, b must not coincide but must differ by a triangulation angle $\alpha_1$, $\alpha_2$. At present the two directions $\alpha_1$, $\alpha_2$ are selected so that they are arranged symmetrically on both sides of the irradiation direction 17, thus relative to a perpendicular of the surface 2, thus respectively have an intermediary angle $\alpha_1, \neq \alpha_2$ from the orthogonal.

A surface imperfection, for example a protrusion 2a on a surface of the soldering seam 2 in an impact portion of the light beam 3 does not generate a straight line since it is an image 4' on the surface 2 an thus also does not generate a straight line on the sensor 12, 12', but a line with a bulge 4a included therein, wherein this bulge of the image 4, thus of the light line differs as a function of the triangulation angle $\alpha$ and the viewing angle $\beta$ from the actual shape of the bulge 2a cut along the perpendicular 21. Knowing the angles $\alpha_1$, $\alpha_2$, $\beta_1$, $\beta_2$ and focusing on the surface and/or knowing the distance 22 of the detector unit 6a, b from the surface 2 facilitates mathematical conclusions from the dimensions of the image 4 regarding the actual dimensions of the bulge 2a on the surface 2.

As illustrated in FIG. 1 the scanning head 6 is configured with very compact dimensions in the main plane 20 which is facilitated in that the light source 14, typically a laser cartridge, is arranged proximal to the pass through 23a in the housing 16 that is provided for the light beam and the optical sensor 12 is arranged proximal to the other pass through 23b openings which are both arranged in one of the narrow sides of the housing 16, wherein a deflection of the incoming light beam is provided between this pass through 23b and the optical sensor 12, 12', thus the viewing direction 5 through a mirror 19 in a direction approximately parallel to the outer edge in which the pass through openings 23a, b are arranged.

The sensor 12, 12' and also the mirror 19 are thus attached at a detector base element which is in turn fixated at the housing 16.

Thus, sufficient space remains on the half of the housing 16 that is oriented away from the outside with the pass through openings 23a, b in order to arrange a circuit board 24 at this location wherein the circuit board is oriented in the main direction 20 of the housing and includes the entire electronic processing unit 11 and is connected with the sensors 12, 12' through electrical conductors as well as with the light source 14. The resultant data determined by the processing unit 11 are put out through a plug 26.

The individual images generated by the light section method are repeated in a rapid time sequence in order to continuously monitor the soldering seam 2 of the object 1 that moves in movement direction 7 relative to the scanning head 6.

FIGS. 3a and b show typical images 4 of the light line 3 as represented in the two test units 6a, b on the optical sensor 12 arranged therein.

Since the surface of the optical sensor 12 is divided by the lines Z1, Z2 etc. and by the rows R1, R2 in a grid pattern into individual pixels, for example P 30.17, the processing of the optical sensor yields which of the pixels are contacted by the image 4.

From the geometry of the scanning head 6 and the components installed therein and its known position relative to the testing location 2', the processing electronics can determine a precise cross section contour, in this case of the soldering seam 2 and using the images captured in sequence, the scans S1, S2 etc. the entire three dimensional contour of the portions of the surface to be tested can be determined.

FIG. 4 illustrates a scanning of the surface 22 which includes a step configured as a height distance h which is intended to show the quality of the resolution of the optical scanning head 6.

In the right image portion the material whose surface 22 shall be scanned is made from glass. A light beam 3 impacting the glass surface directly from a light source 14 in the form of a laser L2 would penetrate the glass due to a lack of reflection at the glass surface and would not be reflected at all so that the optical sensor 12 of the associated test unit 6a (the other test unit 6b is not illustrated for reasons of clarity) would not receive any reflected light.

However, when the light beam 3 of the light source 14 configured as a laser L3 impacts many small liquid droplets 8 which are arranged adjacent to each other if possible without a gap directly adjacent to one another and which have a semi-circular or lenticular surface as illustrated in the right portion of FIG. 4 the surfaces of the liquid droplets 8 reflect the light beams 3 in many different directions. This diffuse reflection reflects a portion of the reflected light also in the viewing direction 5 and impacts the optical sensor 12 of the test unit 6a.

It is secondary in which manner the liquid droplets 8 that are configured with a lenticular or semi-circular surface are generated. It is only important that their surface structure is convex cambered and that gaps between individual liquid droplets 8 are provided that are as small as possible, wherein the liquid droplets 8 contrary to the illustration in FIG. 4 do not all have to have identical sizes.

It is further important that the liquid droplets 8 have not already united again to form a continuous liquid layer with a smooth surface during optical scanning.

The smaller the diameter of the liquid droplets 8 compared to the maximum resolution of the measuring device, for example the elevation distance h, the less the measuring result is influenced negatively.

Advantageously the diameter of the liquid droplets 8 should be at the most 1/10, better 1/30, better 1/50 of the best resolution of the scanning head 6, thus for example of the smallest measurable height distance h of a step in the surface 22.

FIG. 5 illustrates a scanning head 6 that is retrofitted according to the invention.

In a center portion the optical scanning head 6 corresponds to a known scanning head as illustrated in FIG. 1.

In movement direction 7 additional units are installed upstream and downstream of the optical scanning head 6 in order to cause the wetting with many small liquid droplets 8 described in FIG. 4 in the portion in which the light beam 3 impacts the surface 22 to be tested.

In the movement direction 7 the forward most unit is a cooling source 10 which produces for example cold air 13 and lets it flow out of a nozzle which is directed to the surface 22 on the movement path of the optical scanning head 6. This cools the surface 21 to a particular nominal temperature which can be tested by a temperature sensor 27 which is arranged behind the outflow opening at the cooling source 10 or at another location of the scanning head 6 and which measures a temperature of the surface 22 touch free.

In the movement direction 7 behind the outflow opening of the cooling source 10 but still in front of the scanning head 6 a first gas processor 25a is provided which saturates any operating gas, typically air with moisture from which the liquid droplets 8 shall be made and the humid air 9 thus saturated and typically also heated flows onto the surface 22.

Since the surface 22 is significantly cooler than the impacting humid air 9 its moisture condenses on the surface 22 in the form of small liquid droplets 8.

In movement direction 7 behind the optical scanning head 6 another gas processor 25b is provided which in turn processes an operating gas typically air by heating the gas and optionally drying it.

This dry air 15 is put out onto the surface 22 and the liquid droplets 8 still provided thereon wherein the liquid droplets are evaporated by the warm air 15 and disintegrate.

Thus, the surface 22 of the work piece is provided in its original condition again.

REFERENCE NUMERALS AND DESIGNATIONS 1 object
2 soldering seam
2' testing location
2a recess
2b protrusion
3 light beam, illumination direction
4 image
4a bulge
4b recess
5, 5' viewing direction
6 scanning head
6a, b detector unit
7 movement direction
8 liquid droplets
9 humid air
10 cooling source
11 electronic processing unit
12, 12' optical sensor
13 cold air
14 light source
15 dry air
16 housing
17 radiation direction
18 viewing width
19 mirror
20 viewing plane
21 orthogonal
22 surface
23 pass through opening
24 circuit board
25 gas processor
26 outlet
27 temperature sensor
Z1 line
R1 row
S1 scan
b, B width
h height difference

The invention claimed is:

1. A method for optical touch free scanning of surfaces which comprises:
   a plurality of liquid droplets (8) is stored adjacent to one another on a surface (22)
   thereafter optical scanning is performed as long as the individual liquid droplets (8) are still configured on the surface (22),
   wherein the liquid droplets (8) are generated through precipitation from a gas phase, and
   wherein the surface (22) is actively cooled before precipitation by flowing cold air (13) onto the surface (22).

2. The method according to claim 1,
characterized in that
   the liquid droplets (8) are applied so that the liquid droplets (8) cover the surface (22) to a largest possible extent or the liquid droplets (8) are arranged separately from one another on the surface (22).

3. The method according to claim 1,
characterized in that
   the liquid droplets (8) are arranged at a smallest possible distance from each other, at a distance which is smaller than their diameter in top view.

4. The method according to claim 1,
characterized in that
   the liquid droplets (8) have a diameter in top view below 100 µm.

5. The method according to claim 1,
characterized in that
   the liquid droplets (8) are deposited on the surface (22) so that the liquid droplets (8) that are arranged adjacent to each other form a fine relief structure on the surface (22).

6. The method according to claim 5,
characterized in that
   the liquid droplets (8) are deposited by spraying a liquid with a nozzle onto the surface (8).

7. The method according to claim 1,
characterized in that
   precipitation from the gas phase is favored by a temperature of the surface (22) which is lower than a gas temperature adjacent to the surface (22).

8. The method according to claim 1,
characterized in that
   precipitation from the gas phase is facilitated by covering the surface (22) with air (9) that is warmer than the surface or with gas with a high degree of Saturation of water dissolved therein or another liquid.

9. A device for optical touch free scanning of surfaces comprising:
- a scanning head with a light source (14) and an optical sensor (12);
- a liquid source for depositing a plurality of liquid droplets (8) on the surface (22),
- a cooling source (10) for the surface (22) to be wetted, wherein the cooling source is provided in the form of an air jet for supplying cold air (13) with a lower temperature than a current temperature of the surface (22), wherein the liquid source is arranged between an outflow opening of the cooling source (10) and the scanning head.

10. The device according to claim 9, characterized in that
the liquid source includes a nozzle for the liquid or an outlet opening for a gas saturated by the liquid, in particular air (9).

11. The device according to claim 10, characterized in that
the liquid source, in particular the nozzle or the outlet opening is arranged at the scanning head.

12. The device according to claim 9, characterized in that
the device includes a heating device for the liquid saturated gas (9) to be put out.

13. The device according to claim 9, characterized in that
the device includes a temperature sensor (27), in particular a touch free temperature (27) for measuring the temperature of the surface (22) in the scanning portion.

14. The device according to claim 9, characterized in that
the device includes a control which is configured to control the wetting with respect to the liquid droplets (8) to be deposited on the surface (22).

* * * * *